US009798527B1

(12) United States Patent
Bendersky et al.

(10) Patent No.: US 9,798,527 B1
(45) Date of Patent: Oct. 24, 2017

(54) LOOP AND LIBRARY FUSION

(71) Applicant: Google Inc., Mountain View, CA (US)

(72) Inventors: Eli Bendersky, Sunnyvale, CA (US); Robert Hundt, Oakland, CA (US); Mark Heffernan, Mountain View, CA (US); Jingyue Wu, Newark, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/400,942

(22) Filed: Jan. 6, 2017

(51) Int. Cl.
*G06F 9/45* (2006.01)
*G06F 17/30* (2006.01)
*G06N 3/08* (2006.01)

(52) U.S. Cl.
CPC ............ *G06F 8/443* (2013.01); *G06F 8/41* (2013.01); *G06F 17/30958* (2013.01); *G06N 3/08* (2013.01)

(58) Field of Classification Search
CPC .......... G06F 8/41; G06F 8/443; G06F 8/4435; G06F 17/30958; G06N 3/08
USPC .................................................. 717/151–161
See application file for complete search history.

(56) References Cited

U.S. PATENT DOCUMENTS

| | | | | |
|---|---|---|---|---|
| 5,822,593 A | * | 10/1998 | Lamping | G06F 9/44 717/144 |
| 6,058,266 A | * | 5/2000 | Megiddo | G06F 8/452 717/156 |
| 6,070,011 A | * | 5/2000 | Liu | G06F 8/443 717/154 |
| 2006/0080635 A1 | * | 4/2006 | Anwar | G06F 9/44521 717/100 |
| 2008/0091926 A1 | * | 4/2008 | Kawahito | G06F 8/445 712/226 |
| 2009/0307675 A1 | * | 12/2009 | Ng | G06F 8/4441 717/160 |
| 2009/0328021 A1 | * | 12/2009 | Ng | G06F 8/452 717/160 |

(Continued)

OTHER PUBLICATIONS

"Convolution," <http://homepages.inf.ed.ac.uk/rbf/HIPR2/convolve.htm>, 2003, p. 1-2.*

(Continued)

*Primary Examiner* — Qing Chen
(74) *Attorney, Agent, or Firm* — Fish & Richardson P.C.

(57) ABSTRACT

Methods, systems, and apparatus, including computer programs encoded on computer storage media, for generating efficient compiled code. In an example method, a compilation system obtains an un-optimized computational graph comprising a plurality of nodes representing operations and directed edges representing data dependencies. The un-optimized computational graph is analyzed using pattern matching to determine fusable operations that can be fused together into a single fusion operation. The un-optimized computational graph is transformed into an optimized computational graph by replacing the nodes representing the fusable operations in the un-optimized computational graph with a fusion node representing the single fusion operation. The compilation system produces efficient code by translating the fusion node of the optimized computational graph as a call that performs the fused operations.

18 Claims, 6 Drawing Sheets

(56) References Cited

U.S. PATENT DOCUMENTS

| | | | | |
|---|---|---|---|---|
| 2010/0070956 | A1* | 3/2010 | Leung | G06F 8/452 717/143 |
| 2011/0047534 | A1* | 2/2011 | Ye | G06F 8/443 717/160 |
| 2011/0066885 | A1* | 3/2011 | Reynolds | G06F 9/526 714/16 |

OTHER PUBLICATIONS

Darte, Alain, "On the complexity of loop fusion," 2000, Elsevier, p. 1175-1193.*

Ganesh, Amit, "Fusing Loops With Backward Inter Loop Data Dependence," Dec. 1994, ACM, p. 25-30.*

Liu et al., "General Loop Fusion Technique for Nested Loops Considering Timing and Code Size," Sep. 2004, ACM, p. 190-201.*

"Loop Fusion," <http://www.compileroptimizations.com/category/loop_fusion.htm>, 2012, p. 1.*

Marchal et al., "Optimizing the Memory Bandwidth with Loop Fusion," Sep. 2004, ACM, p. 188-193.*

Megiddo et al., "Optimal Weighted Loop Fusion for Parallel Programs," 1997, ACM, p. 282-291.*

Qasem et al., "Profitable Loop Fusion and Tiling Using Model-driven Empirical Search," Jun. 2006, ACM, p. 249-258.*

Qian et al., "Loop Fusion for Clustered VLIW Architectures," Jun. 2002, ACM, p. 112-119.*

Zhu et al., "The Energy Impact of Aggressive Loop Fusion," 2004, IEEE.*

Kennedy and McKinley, "Maximizing Loop Parallelism and Improving Data Locality via Loop Fusion and Distribution," (1993) [online] (retrieved from http://www.cs.utexas.edu/users/mckinley/papers/lcpc-1993.pdf), 20 pages.

Ragan-Kelley et al., "Halide: A Language and Compiler for Optimizing Parallelism, Locality, and Recomputation in Image Processing Pipelines," (2013) [online] (retrieved from http://people.csail.mit.edu/jrk/halide-pldi13.pdf), 12 pages.

* cited by examiner

LOOP AND LIBRARY FUSION

BACKGROUND

This specification relates to constructing and compiling computational graphs.

A computational graph defines sequences of operations by the types of operations, the data that is input into and output from each operation, and computational dependencies. A compiler translates a computational graph of operations to produce compiled code.

SUMMARY

This specification describes technologies relating to computational graph systems in general, and specifically to systems and methods for representing computations as graph operations that can be translated into efficient compiled code.

The computational graph includes nodes, connector director directed edges, and parameter directed edges. Each node represents a respective operation, each connector directed edge connects a respective first node to a respective second node that represents an operation that receives, as input, an output of an operation represented by the respective first node, and each parameter directed edge connects into a respective node and represents a flow of one or more parameters of a neural network as input to the operation represented by the respective node.

In general, one innovative aspect of the subject matter described in this specification can be embodied in a system comprising one or more computers and one or more storage devices storing instructions that are operable, when executed by the one or more computers to cause the one or more computers to perform operations that implement an example method. An example method comprises: obtaining an un-optimized computational graph comprising a plurality of nodes representing operations and directed edges representing data dependencies; analyzing the un-optimized computational graph using pattern matching to determine fusable operations that can be fused together into a single fusion operation; transforming the un-optimized computational graph into an optimized computational graph by replacing the nodes representing the fusable operations in the un-optimized computational graph with a fusion node representing the single fusion operation; and providing to a compiler the fusion node of the optimized computational graph that the compiler can translate as a call that performs the fused operations to produce efficient code.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

These and other embodiments can optionally include one or more of the following features. The efficient code can be provided to computing devices for execution. Execution can include executing the operations of the computational graph including the single fusion call that performs all fused operations. Analyzing the un-optimized computational graph using pattern matching to determine fusable operations that can be fused together into a single fusion operation includes: comparing portions of the un-optimized computational graph with patterns of operations that each correspond to a single fusion operation; determining that a pattern matches a portion of the un-optimized computational graph; and determining that the matching portion of the un-optimized computational graph can be replaced in the computational graph with the single fusion operation corresponding to the matching pattern. The single fusion operation may be an external code library operation. The single fusion operation may be a loop operation. Analyzing the un-optimized computational graph using pattern matching to determine fusable operations that can be fused together into a single fusion operation may include: searching the un-optimized computational graph for an input operation that requires computations to produce the input; and determining that the input operation can be replaced in the computational graph with a single fusion operation corresponding to the computations required to produce the input. The fusable operations may be regular operations. The fusable operations may be regular operations that are fused into non-regular operations. Analyzing the un-optimized computational graph using pattern matching to determine fusable operations that can be fused together into a single operation may include: finding a sequence of operations in a computational graph using a sequencing algorithm; and determining that the operation sequence can be fused together using composition into a single fusion operation.

The subject matter described in this specification can be implemented in particular embodiments so as to realize one or more of the following advantages. An example implementation produces efficient compiled code by merging operations into a single fused operation that a compiler can translate as a single call, e.g., a loop or a library call. For the purposes of this specification, efficient compiled code means code that is faster and potentially uses less memory than the code compiled using a traditional compiler.

The single call to which the compiler translates the single fused operation performs all the operations of the fused operation, at a code generation phase of compilation. This translation allows the compiler to generate code that is faster than code generated by a traditional compiler, which translates one operation at a time. Additionally, by using fused operations that may use less memory than unfused operations, the compiler produces code that is more memory efficient than the code produced by a traditional compiler.

By fusing operations, an example implementation can also provide programs of a smaller size than a traditional compiler.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5b illustrates an optimized version of the subgraph illustrated in FIG. 5a.

Like reference numbers and designations in the various drawings indicate like elements.

DETAILED DESCRIPTION

Figure 1:
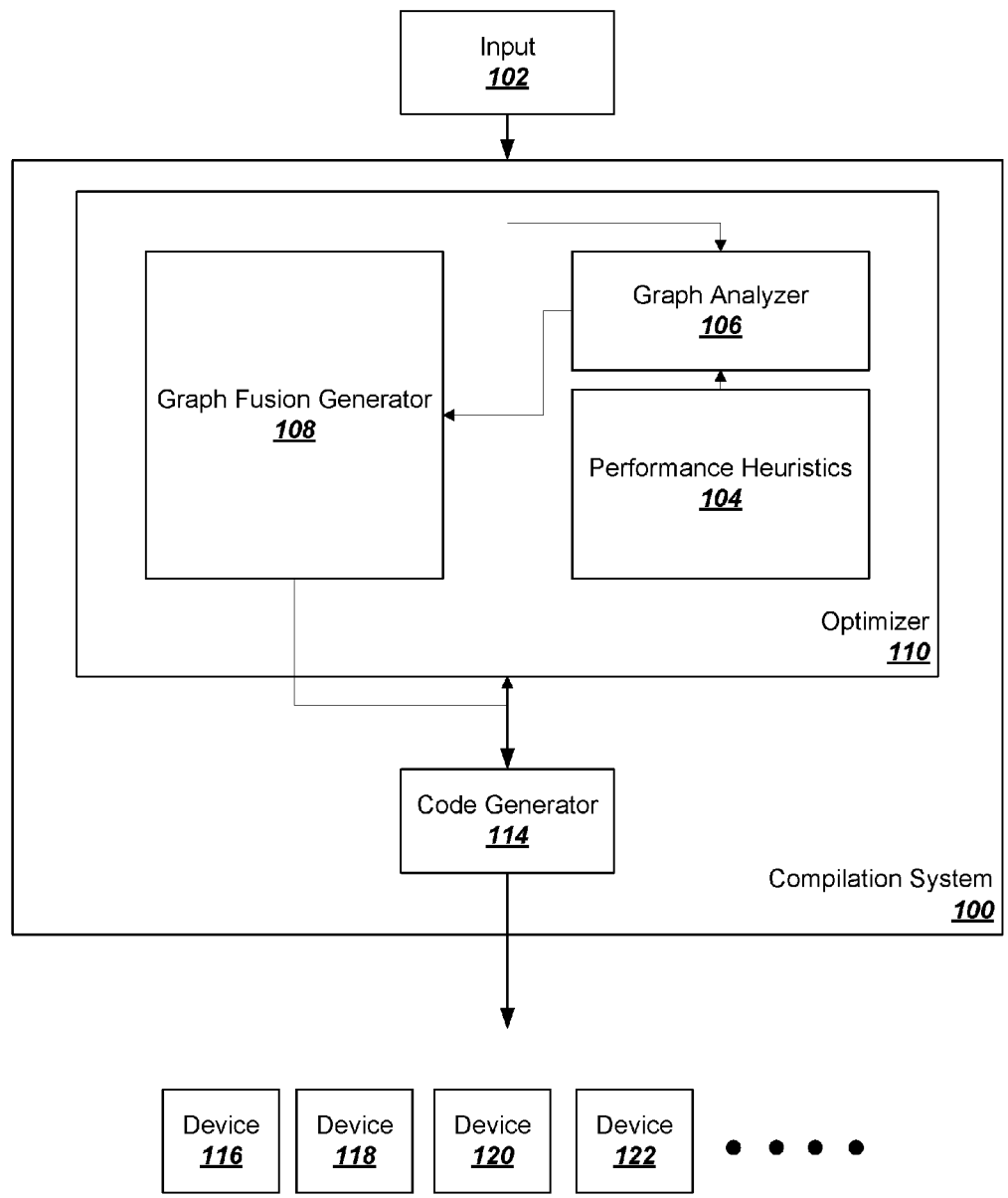
FIG. 1 illustrates an example compilation system.

This specification generally describes a compilation system that compiles operations represented by a computational graph. Particularly, this specification describes techniques for generating efficient code from computations within a computational graph by fusing together computations.

A computational dataflow graph expresses computations, e.g., of a machine learning model, with nodes representing operations and directed edges representing data dependencies between operations. An incoming edge to a node represents a flow of an input into the node, i.e., an input argument to the operation represented by the node. If all arguments required for an operation are available to the operation node, the node is enabled and can be executed.

An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

In some implementations, the operations represented in the computational graph are linear algebraic operations, e.g., matrix multiply, neural network operations, or operations for a different kind of machine learning model. A neural network is a machine learning model that employs one or more layers of nonlinear units to predict an output for a received input. Some neural networks are deep neural networks that include one or more hidden layers in addition to an output layer. The output layer of each hidden layer is used as input to another layer in the network, i.e., another hidden layer, the output layer, or both. Some layers of the network generate an output from a received input in accordance with a current value of a respective set of parameters, while other layers of the network may not have parameters.

The operations represented by the computational graph may be operations necessary for the neural network to compute an inference, i.e., to process an input through the layers of the neural network to generate a neural network output for the input. Additionally or alternatively, the operations represented by the computational graph may be operations necessary to train the neural network by performing a neural network training procedure to adjust the values of the parameters of the neural network, e.g., to determine trained values of parameters from initial values of the parameters using backpropagation. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, the matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

In an example system, one or more sets of nodes in the computational graph may represent operations that control the dataflow through a computational graph. The one or more sets of nodes may, for instance, represent conditional, recursive, and/or iterative control flow statements including: if statements, while loops, do-while loops, for loops for-each loops, or nested control flow statements that include a combination of these statements.

The one or more sets of nodes in the computational graph may represent some operations that can translate into operations of high performance libraries which contain high performance implementations of linear algebraic, e.g., matrix multiply, or neural network operations, e.g., backward convolution.

In an example compilation system, the compilation system fuses multiple operations, into a fusion operation that can be translated into a call at code generation time that performs all the fused operations. This fusion process produces code that is faster and potentially uses less memory for devices such as central processing units (CPUs) or graphical processing units (GPUs).

FIG. 1 illustrates an example compilation system 100. The compilation system 100 is an example of a system implemented as computer programs on one or more computers in one or more locations, in which the systems, components, and techniques described below can be implemented.

The compilation system 100 receives an un-optimized computational graph as input 102. As described above, the computational graph represents operations as one or more sets of nodes and data dependencies between operations as edges.

A graph analyzer 106 of the compilation system 100 analyzes the un-optimized computational graph input 102 using a pattern matcher 104, e.g., improving efficiency by matching a certain pattern in the un-optimized computational graph. The compilation system compares patterns from the pattern matcher 104 with patterns of operations in the computational graph. The graph analyzer 106 then provides the analyzed graph to a graph fusion generator 108.

For each matching pattern, the graph fusion generator 108 merges or fuses multiple operations from the un-optimized computational graph 102 corresponding to the pattern into a single fusion operation to create an optimized computational graph with fusion nodes. The graph fusion generator 108 then provides the optimized computational graph with fusion nodes to a code generator 114. The code generator 114 translates each fusion node as a call, e.g., a loop or a library call, that performs all the fused operations to produce efficient compiled code that can be provided to multiple devices (116, 118, 120, 122) for execution.

Any devices performing the operations represented by the efficient compiled code, e.g., devices 116, 118, 120, 122, can include a memory, e.g., a random access memory (RAM), for storing instructions and data and a processor for executing stored instructions. Generally, each device is a hardware resource that executes the compiled code independent of other devices. For example, each device can have its own processing unit. The devices can be graphical processing units (GPUs), central processing units (CPUs), field programmable gate arrays (FPGAs), application specific integrated circuits (ASICs), or other operation specific processors. By way of illustration, one machine can host one or more devices, e.g., multiple CPUs, GPUs, FPGAs, ASICs, or operation specific processors.

Figure 2:
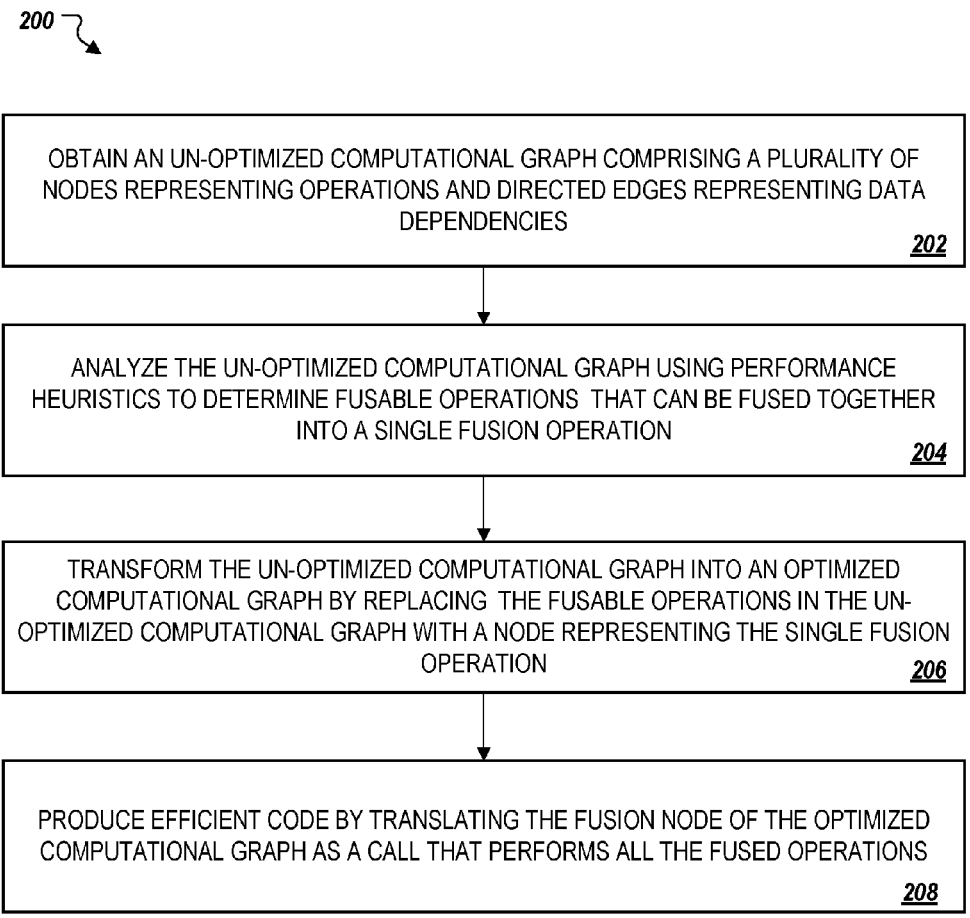
FIG. 2 is a flow diagram of an example process for generating efficient code from computations within a computational graph.

FIG. 2 is a flow diagram of an example process 200 for generating efficient code from computations within a computational graph. For convenience, the process 200 will be described as being performed by a system of one or more computers, located in one or more locations, and programmed appropriately in accordance with this specification. For example, an example compilation system 100 of FIG. 1, appropriately programmed, can perform the process 200.

The system receives an un-optimized computational graph with nodes representing operations and directed edges representing data dependencies 202.

The system then analyzes the computational graph using pattern matching to determine fusable operations that can be fused together into a single fusion operation 204.

The system transforms the un-optimized computational graph into an optimized computational graph by replacing fusable operations in the un-optimized computational graph with a node representing the single fusion operation 206.

The system then produces efficient compiled code by translating the fusion node of the optimized computational graph as a call that performs all the fused operations 208. The efficient compiled code can then be provided to computing devices, such as graphical processing units and central processing units for execution.

Loop Fusion

Loop operations are implemented by iterating through elements of an input array, potentially multiple times, to compute an output array. Loop operations of a computational graph are the form of regular or non-regular operations. A regular operation, e.g., add, exponent, or transpose, reads at most one element from each input array for each element of the output array. A non-regular operation, e.g., dot or convolution, requires reading more than one element of the input array to produce a single element of the output array.

Regular operations can be decomposed into two types of functions: one function which is applied to the input data and one function which is applied to the output index.

For example, a regular unary operation can be expressed as:

$$A[i_0, \ldots, i_{n-1}] = f_{op}(B[f_{index}(i_0, \ldots, i_{n-1})]),$$

where $\{i_0, \ldots, i_{n-1}\}$ is a multidimensional index, $f_{op}$ is the data function, e.g., exponentiation, of the operation which is applied to the data element from the input, and $f_{index}$ is the index function of the operation which maps an index of the output array to an index of the input array. For example, for each iteration of a loop, the example compilation system implicitly constructs the index function $f_{index}$ of the operation in order to determine which element of the input to read. The dimensionality of the output of $f_{index}$ can be different than the input as in, for example, a broadcast operation.

By expressing regular operations using separate index and data functions, the example compilation system can easily fuse operations using the composition of these functions.

Figure 3:
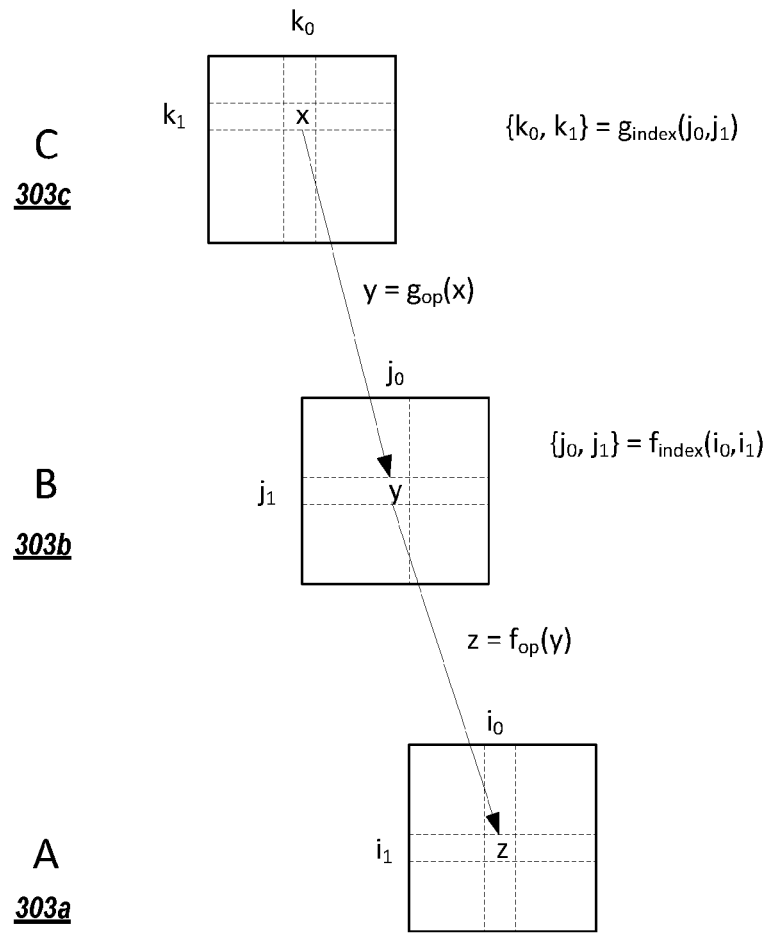
FIG. 3 represents a graphical chain of two regular unary operations.

FIG. 3 represents a graphical chain of two regular unary operations, $B=op_g(C)$ and $A=op_f(B)$ 305. As shown, a first regular unary operation can produce the output array B 303b by performing $op_g$ on the input array C 303c. A second regular unary operation can produce the output array A 303a by performing $op_f$ on the input array B 303b. The operation $op_f$ has data function $f_{op}$ and index function $f_{index}$ and the operation $op_g$ has a data function $g_{op}$ and index function $g_{index}$.

The output array A 303a can be expressed as a function of C 303c:

$$A[i_0, i_1] = f_{op}(g_{op}(C[g_{index}(f_{index}(i_0, i_1))])).$$

This expression fuses $op_f$ and $op_g$. The expression is in the form of a composition, which can be used to fuse any sequence of regular operations.

To fuse operations, each operation should decompose into data functions and index functions. Some examples of regular operations decomposed into a data function $f_{op}$ and an index function $f_{index}$ are:

(1) Element-wise unary exponentiation operations $$f_{op}(x) = \exp(x)$$

$$f_{index}(i_0, \ldots, i_{n-1}) = \{i_0, \ldots, i_{n-1}\}$$

(2) Transpose $$f_{op}(x) = x$$

$$f_{index}(i_0, i_1) = \{i_0, i_1\}$$

(3) Slice (takes start and end indices)

$$f_{op}(x) = (x)$$

$$f_{index}(i_0, \ldots, i_{n-1}) = \{i_0 + start_0, \ldots, i_{n-1} + start_{n-1}\}$$

As an example, suppose the code of Table 1 is code to be compiled.

TABLE 1

| |
|---|
| C = . . . |
| B = op0(C) |
| A = op1(B) |
| D = op2(B) |

The compilation system analyzes the computational graph representing the code using pattern matching. For fusing unary operations, the compilation system searches the compilation graph and gathers as many regular operations together as possible for fusion. If an operation selected for fusion is used outside of the fusion operation, the operation will have to be computed twice—once inside the fusion operation and once outside the fusion operation.

For example, the compilation system can use known patterns of operations or algorithms to find chains of operations that can be fused together. In the example of Table 1, applying regular unary operation fusion yields:

$$A = (op1 \circ op0)(C)$$

$$D = (op2 \circ op0)(C)$$

For a non-unary regular operations, e.g., A=op(B,C), the operations can also be expressed as data functions and index functions. For example, A=op(B,C) may be represented as:

$$A[i_0, \ldots, i_{n-1}] = f_{op}(B[f_{index0}(i_0, \ldots, i_{n-1})], C[f_{index1}(i_0, \ldots, i_{n-1})]),$$

where $f_{index0}$ and $f_{index1}$ may be the same, e.g., in element-wise Add where the index function is the identity, or may be different, e.g., as in a concatenate and binary operation with broadcast. The same rules of composition apply to non-unary regular operations. For example, the code of Table 2 may need to be compiled.

TABLE 2

| |
|---|
| C = $op_g$(D) |
| A = $op_f$(B, C) |

If $op_g$ has index and data functions $g_{index}$ and $g_{op}$ and $op_f$ has $f_{index}$ and $f_{op}$ then the fusion operation can be expressed as:

$$A[i_0, \ldots, i_{n-1}] = f_{op}(B[f_{index0}(i_0, \ldots, i_{n-1})], g_{op}(D[g_{index1}(f_{index1}(i_0, \ldots, i_{n-1}))])).$$

Figure 4:
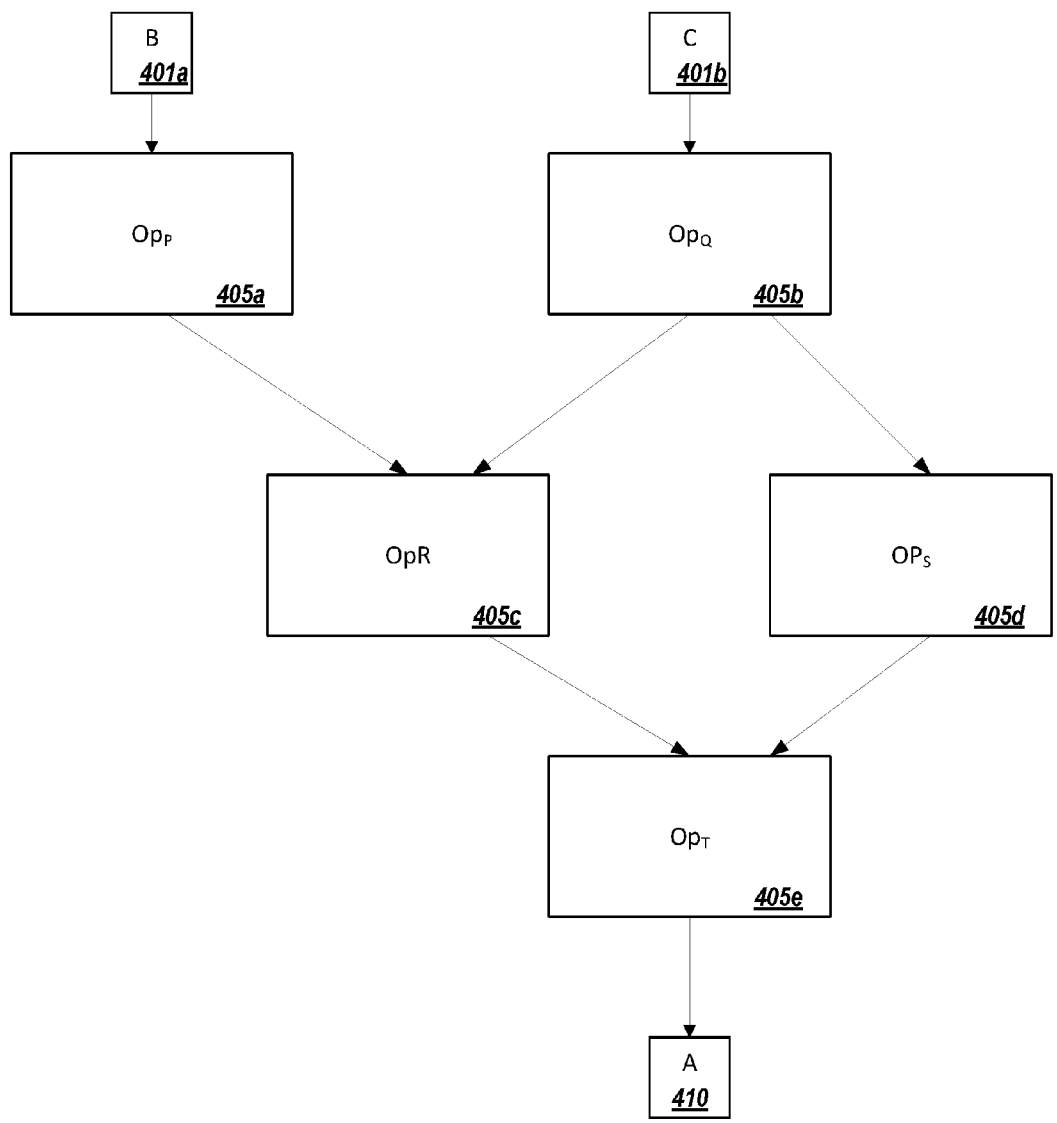
FIG. 4 represents operations of non-unary operations that can be fused together.

FIG. 4 illustrates operations of non-unary operations of Table 3 that can be fused together. Non-unary operations form a graph rather than a chain.

TABLE 3

| |
|---|
| D = $Op_P$(B) |
| E = $Op_Q$(C) |
| F = $Op_R$(D, E) |
| G = $Op_S$(E) |
| A = $Op_T$(F, G) |

As disclosed above, in order to find operations that can be fused together, the compilation system analyzes the computational graph representing the code using pattern matching. For fusing non-unary operations, the compilation system tries to fuse as many regular operations as possible subject to a limit on the number of inputs to the fusion operation. Too many inputs can increase memory usage and hinder performance.

For example, the compilation system can use known patterns of operations or algorithms to find operations that can be fused together. In the example of Table 3, applying regular non-unary operation fusion yields:

$$A[i_0, \ldots, i_{n-1}] = t_{op}(r_{op}(p_{op}(B[b\_index]),$$

$$q_{op}(C[c\_index\_0])),$$

$$s_{op}(q_{op}(C[c\_index\_1])))$$

where:
b_index=$p_{index}(r_{index}(t_{index}(i_0, \ldots, i_{n-1})))$
c_index_0=$q_{index}(r_{index}(t_{index}(i_0, \ldots, i_{n-1})))$
c_index_1=$q_{index}(s_{index}(t_{index}(i_0, \ldots, i_{n-1})))$ In this example, $X_{index}$ is the index function for $op_x$ and $X_{op}$ is the data function for $op_x$. The compilation system constructs this fused representation by traversing all paths in the graph from A 410 up to the inputs, B 401a and C 401b. Traversing upwards composes the index functions, from A 410 to $Op_T$ 405e to $Op_R$ 405c and Ops 405d and then to $Op_P$ 405a and $Op_Q$ 405b and finally to inputs B 401a and C 401b. Traversing down composes the data functions.

Regular operations can also be fused into some non-regular operations for better code efficiency. For example, consider the following implementation of column reduction in Table 4, which is a non-regular operation:

TABLE 4

| |
|---|
| 1 linear_index = threadIdx.x + blockIdx.x * blockDim.x |
| 2 y_in_tiles = linear_index / width; |
| 3 x = linear_index % width; |
| 4 |
| 5 |
| 6 partial_result = init_value; |
| 7 for (element_id_in_tile : range(0, kTileSize)) { |
| 8   y = y_in_tiles * kTileSize + element_id_in_tile; |
| 9   if (y in bounds) { |
| 10     partial_result = Reducer(partial_result, input[y][x]); |
| 11   } |
| 12 } |
| 13 AtomicReducer(&output[x], partial_result); |

The column reduction algorithm divides an input matrix into tiles, each of which is reduced by a thread. Each thread accumulates the partial reduction results to the output vector. This reduction is not a regular operation because each output element is computed by multiple threads instead of one. However, the operations that generate the input elements may be fused into the column reduction if they are regular operations. For example, the input into the reducer operation on line 10 may be a subtraction between two numbers, a left hand side of the subtraction operation, lhs[y][x], and a right hand side of the subtraction operation, rhs[y][x].

TABLE 5

| |
|---|
| 1 linear_index = threadIdx.x + blockIdx.x * blockDim.x |
| 2 y_in_tiles = linear_index / width; |
| 3 x = linear_index % width; |
| 4 |
| 5 |
| 6 partial_result = init_value; |
| 7 for (element_id_in_tile : range(0, kTileSize)) { |
| 8   y = y_in_tiles * kTileSize + element_id_in_tile; |
| 9   if (y in bounds) { |
| 10     partial_result = Reducer(partial_result, lhs[y][x] - rhs[y][x]); |
| 11   } |
| 12 } |
| 13 AtomicReducer(&output[x], partial_result); |

Table 5 illustrates fusing the operations that generate the input element into the column reduction. Line 10 shows the actual input element calculation. By fusing the calculation into the column reduction, the compilation system generates code that does not need a separate kernel for subtraction or extra space to hold the subtraction result.

As disclosed above, in order to find input operations that can be fused together, the compilation system analyzes the computational graph representing the code using pattern matching. The compilation system may, for example, fuse element-wise operations, which are a subset of regular operations, into non-regular operations. Element-wise operations read the input element at the same index as the output element. Therefore, fusing element-wise operations does not change the memory access pattern of the non-regular operation.

Library Fusion

Some hardware vendors provide high performance libraries along with their hardware. These libraries may contain high performance implementations of operations. However, the libraries are often closed-source, and/or written with hardware insights that are not public. An example compilation system uses these vendor-provided libraries for certain patterns of computations within a computational graph.

The example compilation system searches for operations of a computational graph that can be fused together by analyzing the computational graph representing the code using pattern matching. For example, the compilation system may improve efficiency by looking for certain patterns of subgraphs of operations that match known library operations. These subgraphs can then be replaced in the computational graph with fusion nodes that represent library operations.

Figure 5A:
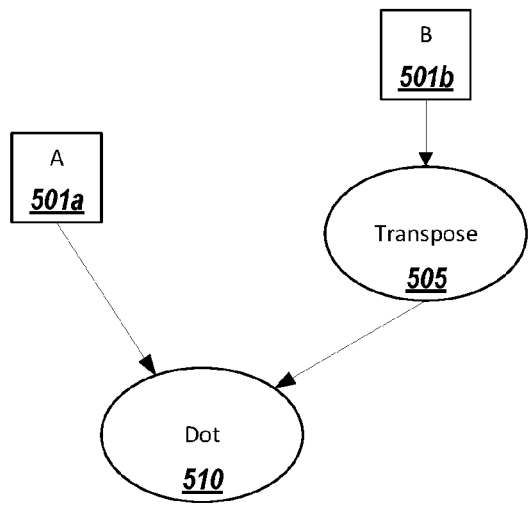
FIG. 5a illustrates a subgraph of a computational graph representing a transposition and a dot operation.

FIG. 5a illustrates a subgraph of a computational graph representing a transposition and a dot operation. This subgraph computes an output array, C, by performing a dot operation on an input array 501a and a transpose operation 505 that transposes an input array B 501b. The subgraph has the form: C=Dot(A, Transpose(B)) as a pattern that matches a known library call. This pattern may match a library call from a library provided by an external hardware vendor.

Figure 5B:
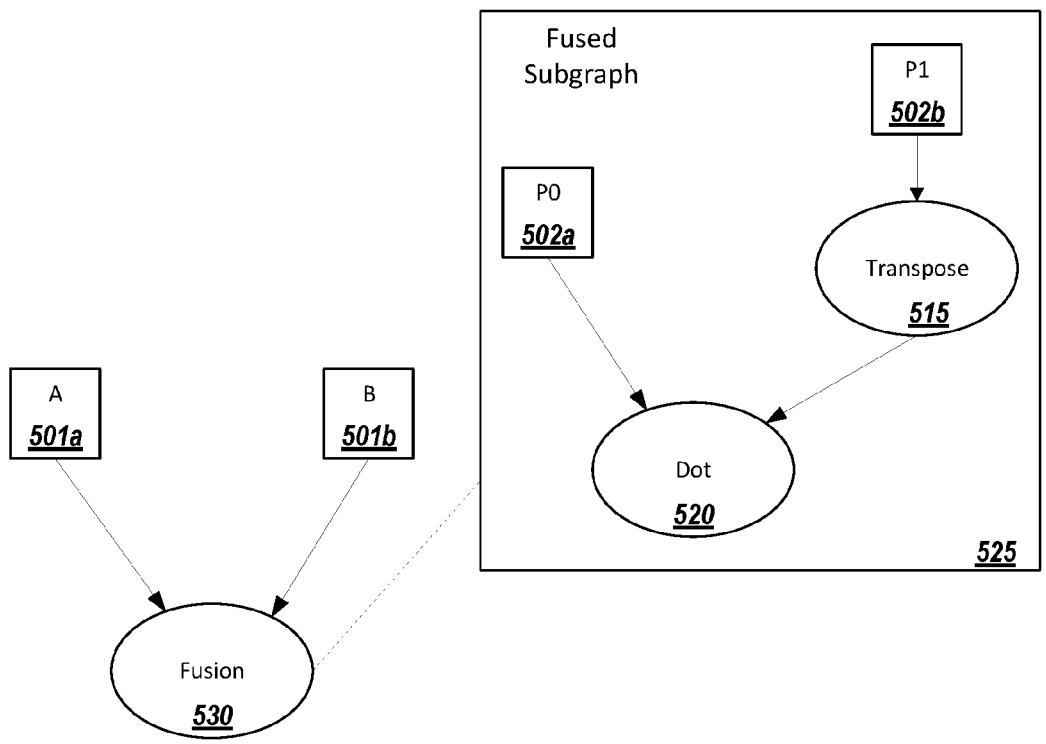

FIG. 5b illustrates an optimized version of the subgraph illustrated in FIG. 5a. The compilation system can use a pattern 525 of a library call that includes input arrays 502a, 502b, a transpose operation 515 and a dot operation to match patterns in the subgraph of FIG. 5a. After the compilation system matches the pattern 525 of the library call to the subgraph of 5a, the compilation system can fuse the subgraph into a single fusion library call operation. The compilation system can then replace the subgraph 5a in the computational graph with a fusion node 530 that represents the single fusion library call. During code generation, the compilation system translates the fusion node into the library call that performs all the fused operations to produce efficient compiled code.

Figure 6A:
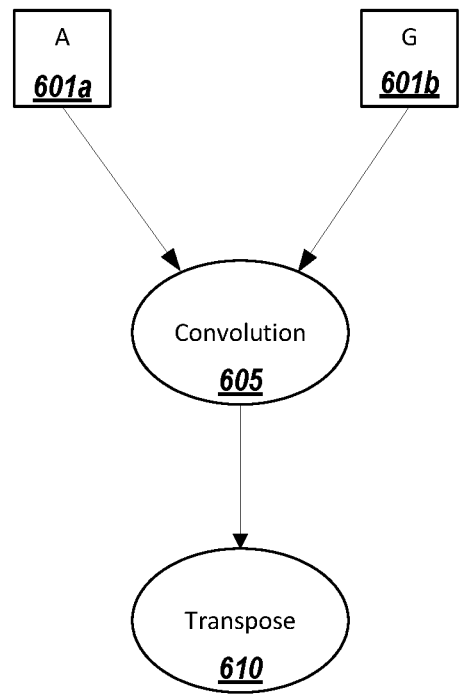
FIG. 6a illustrates a pattern representing backward filter convolution.

FIG. 6a illustrates a pattern representing backward filter convolution. The pattern matches a convolution operation 605 on activations A 601a and gradients G 601b followed by a transposition operation 610. If a computational graph includes this pattern, the compilation system can fuse the subgraph representing the backward filter convolution into a single fusion operation and replace the subgraph in the computational graph with a single fusion node that represents the single fusion backward filter convolution operation.

Figure 6B:
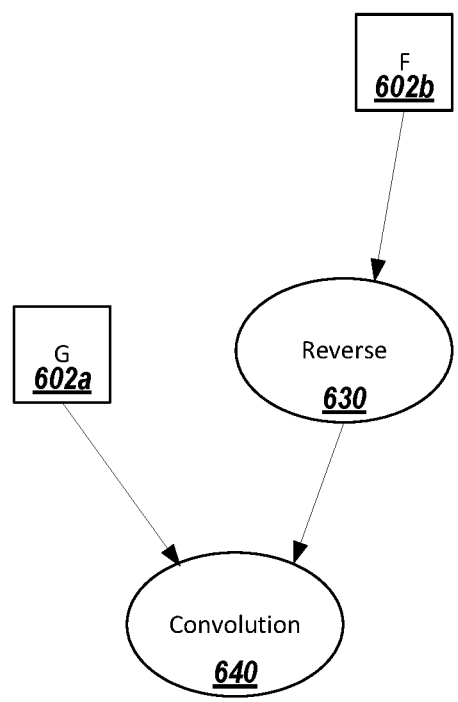
FIG. 6b illustrates a pattern representing backward input convolution.

FIG. 6b illustrates a pattern representing backward input convolution. The pattern matches a convolution operation 640 of gradients G 602a and a mirrored filter F 602b, which is generated by the reverse operation 630. If a computational graph includes this pattern, the compilation system can fuse the subgraph representing the backward input convolution into a single fusion operation and replace the subgraph in the computational graph with a single fusion node that represents the sing fusion backward input convolution operation.

Once a compilation system replaces subgraphs within computational graphs with fusion nodes, the compilation system can translate the fusion nodes into calls that perform all the fused operations. This process produces code that is more efficient than code that is compiled one operation at a time.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Embodiment 1 is a method comprising: obtaining an un-optimized computational graph comprising a plurality of nodes representing operations and directed edges representing dependencies; analyzing the un-optimized computational graph using pattern matching to determine fusable operations that can be fused together into a single fusion operation; transforming the un-optimized computational graph into an optimized computational graph by replacing the nodes representing the fusable operations in the un-optimized computational graph with a fusion node representing the single fusion operation; and providing to a compiler the fusion node of the optimized computational graph that the compiler can translate as a call that performs the fused operations to produce efficient code.

Embodiment 2 is the method of embodiment 1, further comprising: providing the efficient code to computing devices for execution.

Embodiment 2 is the method of embodiment 2, wherein execution includes: executing the operations of the computational graph including the single fusion call that performs all fused operations.

Embodiment 4 is the method of any one of the embodiments 1 through 3, wherein analyzing the un-optimized computational graph using pattern matching to determine fusable operations that can be fused together into a single fusion operation includes: comparing portions of the un-optimized computational graph with patterns of operations that each correspond to a single fusion operation; determining that a pattern matches a portion of the un-optimized computational graph; and determining that the matching portion of the un-optimized computational graph can be replaced in the computational graph with the single fusion operation corresponding to the matching pattern.

Embodiment 5 is the method of any one of the embodiments 1 through 4, wherein the single fusion operation is an external code library operation.

Embodiment 6 is the method of any one of the embodiments 1 through 5, wherein the single fusion operation is a loop operation.

Embodiment 7 is the method of any one of the embodiments 1 through 6, wherein analyzing the un-optimized computational graph using pattern matching to determine fusable operations that can be fused together into a single fusion operation includes: searching the un-optimized computational graph for an input operation that requires computations to produce the input; and determining that the input operation can be replaced in the computational graph with a single fusion operation corresponding to the computations required to produce the input.

Embodiment 8 is the method of any one of the embodiments 1 through 7 wherein the fusable operations are regular operations.

Embodiment 9 is the method of any one of the embodiments 1 through 8 wherein the fusable operations are regular operations that are fused into non-regular operations.

Embodiment 10 is the method of any one of the embodiments 1 through 9 wherein analyzing the un-optimized computational graph using pattern matching to determine fusable operations that can be fused together into a single fusion operation includes: finding a sequence of operations in a computational graph using a sequencing algorithm; and determining that the operation sequence can be fused together using composition into a single fusion operation.

Embodiment 11 is a system of one or more computers and one or more storage devices storing instructions that are operable, when executed by the one or more computers to cause the one or more computers to perform the operations of any one of the embodiments 1-10.

Embodiment 12 is one or more non-transitory computer-readable storage mediums comprising instructions stored thereon that are executable by a processing device and upon such execution cause the processing device to perform the operations of any one of the embodiments 1-10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   obtaining an un-optimized computational graph comprising a plurality of nodes representing operations and a plurality of directed edges representing data dependencies between the operations;
   analyzing the un-optimized computational graph using pattern matching to determine fusable operations that can be fused together, wherein each fusable operation of the fusable operations is decomposed into an index function and a data function;
   generating a single fusion operation using a composition of the index functions and the data functions for the fusable operations;
   transforming the un-optimized computational graph into an optimized computational graph, by replacing the plurality of nodes representing the fusable operations in the un-optimized computational graph with a single fusion node representing the single fusion operation; and
   providing, to a compiler, the optimized computational graph including the single fusion node that the compiler can translate as a call that performs the single fusion operation to produce efficient code at a code generation phase of compilation.

2. The method of claim 1, further comprising:
   providing the efficient code to computing devices for execution.

3. The method of claim 2, wherein execution includes:
   executing fusion operations of the optimized computational graph including the call that performs the single fusion operation.

4. The method of claim 1, wherein analyzing the un-optimized computational graph using pattern matching to determine fusable operations that can be fused together includes:
   comparing portions of the un-optimized computational graph with patterns of operations that each correspond to a single fusion operation;
   determining that a pattern matches a portion of the un-optimized computational graph; and
   determining that the matching portion of the un-optimized computational graph can be replaced in the optimized computational graph with the single fusion operation corresponding to the matching pattern.

5. The method of claim 1, wherein the single fusion operation is a loop operation.

6. The method of claim 1, wherein analyzing the un-optimized computational graph using pattern matching to determine fusable operations that can be fused together includes:
   searching the un-optimized computational graph for a node representing a fusable operation that takes as input an output generated by a chain of operations represented by a chain of nodes in the un-optimized computational graph; and
   determining that the chain of operations can be replaced in the optimized computational graph with a single fusion operation corresponding to the chain of operations required to produce the input.

7. The method of claim 1, wherein the fusable operations are regular operations.

8. The method of claim 1, wherein the fusable operations are regular operations that are fused into non-regular operations.

9. The method of claim 1, wherein analyzing the un-optimized computational graph using pattern matching to determine fusable operations that can be fused together includes:
   finding a sequence of operations in a computational graph using a sequencing algorithm; and
   determining that the sequence of operations that can be fused together using composition into a single fusion operation.

10. A system comprising:
   one or more computers; and
   one or more storage devices storing instructions that are operable, when executed by the one or more computers, to cause the one or more computers to perform operations comprising:
   obtaining an un-optimized computational graph comprising a plurality of nodes representing operations and a plurality of directed edges representing data dependencies between the operations;

analyzing the un-optimized computational graph using pattern matching to determine fusable operations that can be fused together, wherein each fusable operation of the fusable operations is decomposed into an index function and a data function;

generating a single fusion operation using a composition of the index functions and the data functions for the fusable operations;

transforming the un-optimized computational graph into an optimized computational graph, by replacing the plurality of nodes representing the fusable operations in the un-optimized computational graph with a single fusion node representing the single fusion operation; and providing, to a compiler, the optimized computational graph including the single fusion node that the compiler can translate as a call that performs the single fusion operation to produce efficient code at a code generation phase of compilation.

11. The system of claim 10, wherein the operations further comprise:

providing the efficient code to computing devices for execution.

12. The system of claim 11, wherein execution includes:

executing fusion operations of the optimized computational graph including the call that performs the single fusion operation.

13. The system of claim 10, wherein analyzing the un-optimized computational graph using pattern matching to determine fusable operations that can be fused together includes:

comparing portions of the un-optimized computational graph with patterns of operations that each correspond to a single fusion operation;

determining that a pattern matches a portion of the un-optimized computational graph; and determining that the matching portion of the un-optimized computational graph can be replaced in the optimized computational graph with the single fusion operation corresponding to the matching pattern.

14. The system of claim 10, wherein the single fusion operation is a loop operation.

15. The system of claim 10, wherein analyzing the un-optimized computational graph using pattern matching to determine fusable operations that can be fused together includes:

searching the un-optimized computational graph for a node representing a fusable operation that takes as input an output generated by a chain of operations represented by a chain of nodes in the un-optimized computational graph; and determining that the chain of operations can be replaced in the optimized computational graph with a single fusion operation corresponding to the chain of operations required to produce the input.

16. The system of claim 10, wherein the fusable operations are regular operations.

17. The system of claim 10, wherein analyzing the un-optimized computational graph using pattern matching to determine fusable operations that can be fused together includes:

finding a sequence of operations in a computational graph using a sequencing algorithm; and determining that the sequence of operations that can be fused together using composition into a single fusion operation.

18. One or more non-transitory computer-readable storage media comprising instructions stored thereon that are executable by a processing device and upon such execution cause the processing device to perform operations comprising:

obtaining an un-optimized computational graph comprising a plurality of nodes representing operations and a plurality of directed edges representing data dependencies between the operations;

analyzing the un-optimized computational graph using pattern matching to determine fusable operations that can be fused together, wherein each fusable operation of the fusable operations is decomposed into an index function and a data function;

generating a single fusion operation using a composition of the index functions and the data functions for the fusable operations;

transforming the un-optimized computational graph into an optimized computational graph, by replacing the plurality of nodes representing the fusable operations in the un-optimized computational graph with a single fusion node representing the single fusion operation; and providing, to a compiler, the optimized computational graph including the single fusion node that the compiler can translate as a call that performs the single fusion operation to produce efficient code at a code generation phase of compilation.

* * * * *